(12) United States Patent
da Costa Marques Arrabal et al.

(10) Patent No.: US 12,101,573 B2
(45) Date of Patent: Sep. 24, 2024

(54) SYSTEM FOR CAPTURING AND PROJECTING IMAGES, USE OF THE SYSTEM AND METHOD FOR CAPTURING, PROJECTING AND INSERTING IMAGES

(71) Applicant: Globo Comunicação E Participações S.A., Rio de Janeiro (BR)

(72) Inventors: Alexandre Thadeu da Costa Marques Arrabal, Rio de Janeiro (BR); Rodolpho Barcelos Xavier Filho, São Francisco (BR)

(73) Assignee: Globo Comunicação E Participações S.A., Rio De Janeiro (BR)

( * ) Notice: Subject to any disclaimer, the term of this patent is extended or adjusted under 35 U.S.C. 154(b) by 315 days.

(21) Appl. No.: 17/598,696

(22) PCT Filed: Feb. 7, 2020

(86) PCT No.: PCT/BR2020/000006
§ 371 (c)(1),
(2) Date: Sep. 27, 2021

(87) PCT Pub. No.: WO2020/198823
PCT Pub. Date: Oct. 8, 2020

(65) Prior Publication Data
US 2022/0150386 A1    May 12, 2022

(30) Foreign Application Priority Data

Mar. 29, 2019   (BR) .......................... 1020190064650

(51) Int. Cl.
*H04N 5/222* (2006.01)
*G06T 1/60* (2006.01)
(Continued)

(52) U.S. Cl.
CPC ............. *H04N 5/2224* (2013.01); *G06T 1/60* (2013.01); *G06T 7/292* (2017.01); *G09G 3/32* (2013.01);
(Continued)

(58) Field of Classification Search
None
See application file for complete search history.

(56) References Cited

U.S. PATENT DOCUMENTS

| 6,191,812 B1 * | 2/2001 | Tzidon | H04N 9/75 348/E5.022 |
| 6,752,498 B2 * | 6/2004 | Covannon | H04N 13/346 348/E13.058 |

(Continued)

FOREIGN PATENT DOCUMENTS

| CN | 202608633 U | * 12/2012 |
| CN | 203658722 U | *  6/2014 |

(Continued)

OTHER PUBLICATIONS

PCT International Patent Application No. PCT/BR20/00006, International Preliminary Report on Patentability and International Search Report (English Translation) mailed Apr. 14, 2020, 12 pages.

*Primary Examiner* — Stefan Gadomski
(74) *Attorney, Agent, or Firm* — Craig R. Miles; CR MILES P.C.

(57) ABSTRACT

The invention relates to a system and a method for capturing and projecting images for use in an integrated studio including a real location and panels which render these premises partially virtual, using images generated from outside to create an image that is part real and part virtual by showing the images.

13 Claims, 3 Drawing Sheets

(51) Int. Cl.
*G06T 7/292* (2017.01)
*G09G 3/32* (2016.01)
*H04N 5/445* (2011.01)
*H04N 9/31* (2006.01)
*H04N 23/60* (2023.01)
*H04N 23/695* (2023.01)
*H04N 23/698* (2023.01)
*H04N 23/80* (2023.01)
*H04N 23/90* (2023.01)

(52) U.S. Cl.
CPC ....... *H04N 5/44504* (2013.01); *H04N 9/3188* (2013.01); *H04N 23/64* (2023.01); *H04N 23/695* (2023.01); *H04N 23/698* (2023.01); *H04N 23/80* (2023.01); *H04N 23/90* (2023.01); *G09G 2340/10* (2013.01); *G09G 2340/125* (2013.01)

(56) References Cited

U.S. PATENT DOCUMENTS

| | | | |
|---|---|---|---|
| 7,468,778 B2 | 12/2008 | Thomas et al. | |
| 8,269,900 B2 | 9/2012 | O'Connell | |
| 9,615,054 B1* | 4/2017 | McNelley | H04N 7/144 |
| 10,286,309 B2* | 5/2019 | Lee | A63F 13/26 |
| 10,898,818 B2* | 1/2021 | Karafin | G03H 1/2205 |
| 2003/0224333 A1* | 12/2003 | Vastvedt | G09B 9/02 |
| | | | 434/29 |
| 2007/0009222 A1* | 1/2007 | Koo | H04N 13/395 |
| | | | 348/E13.057 |
| 2007/0098368 A1* | 5/2007 | Carley | H04N 5/772 |
| | | | 386/280 |
| 2008/0178501 A1* | 7/2008 | Crowell | G09F 1/06 |
| | | | 40/124.07 |
| 2008/0246759 A1* | 10/2008 | Summers | G06F 3/0304 |
| | | | 348/E7.083 |
| 2010/0014053 A1* | 1/2010 | Brentnall, III | G03B 21/00 |
| | | | 353/7 |
| 2011/0128555 A1* | 6/2011 | Rotschild | G03H 1/0005 |
| | | | 359/9 |
| 2011/0157297 A1* | 6/2011 | O'Connell | G03B 15/06 |
| | | | 348/E7.083 |
| 2012/0188637 A1* | 7/2012 | Joseph | G02B 30/52 |
| | | | 359/478 |
| 2013/0229482 A1* | 9/2013 | Vilcovsky | H04N 7/144 |
| | | | 348/14.07 |
| 2014/0118336 A1* | 5/2014 | Smithwick | G02B 30/27 |
| | | | 345/419 |
| 2014/0300830 A1* | 10/2014 | Wang | G03B 21/60 |
| | | | 349/86 |
| 2015/0029314 A1* | 1/2015 | Reichow | H04N 13/388 |
| | | | 348/51 |
| 2015/0077592 A1* | 3/2015 | Fahey | G06T 19/006 |
| | | | 348/239 |
| 2016/0343166 A1* | 11/2016 | Inoko | G06T 15/00 |
| 2017/0150108 A1* | 5/2017 | Kong | G03H 1/22 |
| 2017/0223312 A1* | 8/2017 | McNelley | H04N 7/15 |
| 2017/0251172 A1* | 8/2017 | McNelley | G09G 5/00 |
| 2018/0176506 A1* | 6/2018 | McNelley | H04N 7/142 |
| 2019/0141291 A1* | 5/2019 | McNelley | H04N 9/3185 |

FOREIGN PATENT DOCUMENTS

| | | | |
|---|---|---|---|
| CN | 204889366 U | * | 12/2015 |
| CN | 207082314 U | * | 3/2018 |
| EP | 0956709 B1 | | 4/2002 |
| EP | 2408191 A1 | | 1/2012 |
| JP | 2006047610 A | * | 2/2006 |
| KR | 20130142458 A | * | 12/2013 |
| KR | 101433751 B1 | * | 8/2014 |
| KR | 101593136 B1 | * | 2/2016 |

\* cited by examiner

SYSTEM FOR CAPTURING AND PROJECTING IMAGES, USE OF THE SYSTEM AND METHOD FOR CAPTURING, PROJECTING AND INSERTING IMAGES

FIELD OF INVENTION

The invention refers to the field of television production, more specifically to image capture and projection systems and methods, and their use in a TV studio, and the extension of images through virtual projections.

STATE OF THE ART

Currently, the TV and cinema market uses the scenario extension technique, where part of the studio is physically assembled, and another part is created through graphics.

The two main ways to implement scene expansion today are through chrome-keying or through the use of projection screens.

Extending scenarios with Chroma-keying is one of the most used techniques today. In this case, the setting is made up of floors and walls of a homogeneous color, usually green or blue, and may or may not contain additional furniture. The process of replacing the image on the wall is done using a computer program. This way, everything that the camera sees in tone will be exchanged for an image, video, or virtual graphics.

U.S. Pat. No. 6,201,579 describes a virtual studio object position detection device, which comprises providing an object with an emitting device and using the device in conjunction with a patterned chroma-key plane or background to provide the exact position of a TV camera or alone to provide a position for another object or person.

Patent application WO1997028654 describes a video system that creates a virtual shadow of an object filmed in front of a blue screen with a main video camera. The virtual shadow is created using a second camera located as a virtual light source. This system uses the chroma-key color system.

The extension of scenarios with projection screens consists of a simpler and easier to apply technique, although quite restrictive. In this case, a panel or screen is placed as an image, video or virtual graphics, through the presenter who is inside the studio. This technique, however, limits the camera's movements and any wider movement can show the limits of the panel and harm the composition of the image. In this technique, use is restricted to cameras that are stationary or with minimal movement.

The present invention provides a system that allows a virtual image integrated with a real image, executed in real time.

FIGURES

DETAILED DESCRIPTION OF THE INVENTION

Figure 1:
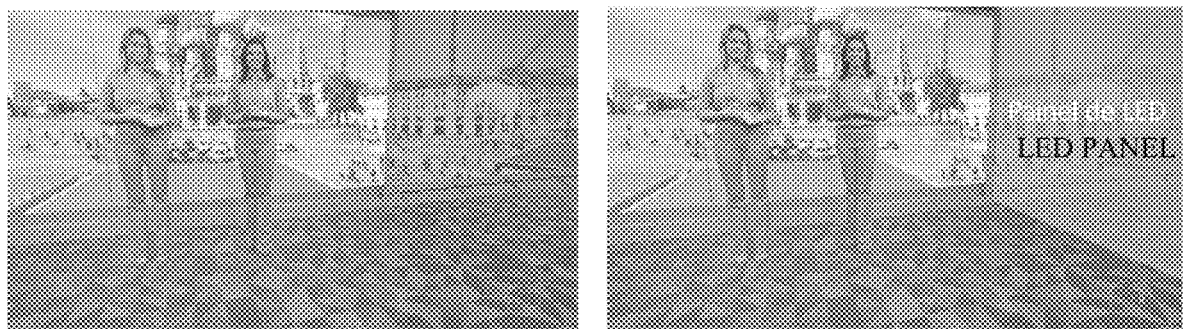
FIG. 1 shows the scenario extension using LED panels.
Figure 2:
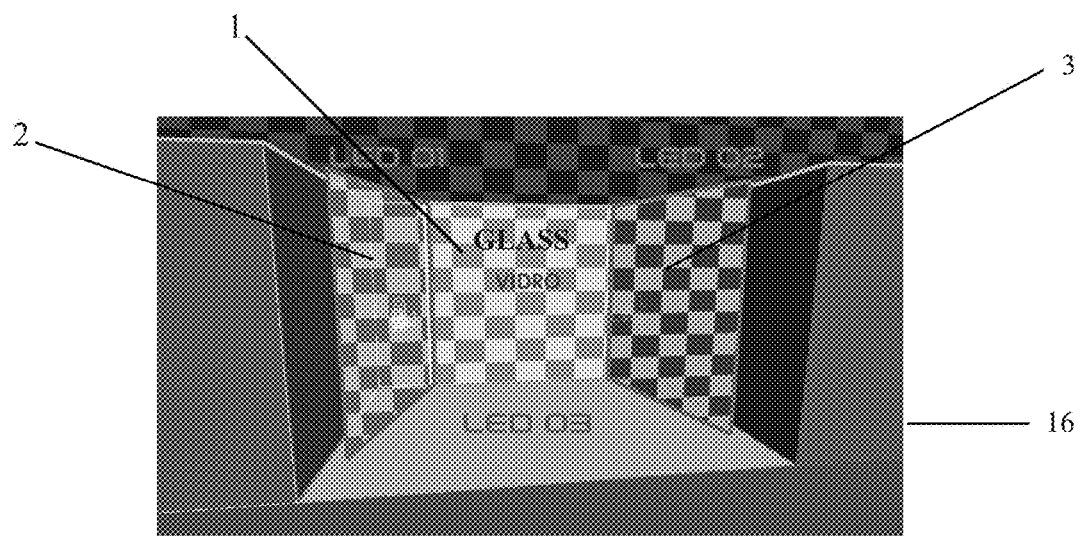
FIG. 2 shows a perspective view of the scenographic elements such as the glass background and LED panels.
Figure 3:
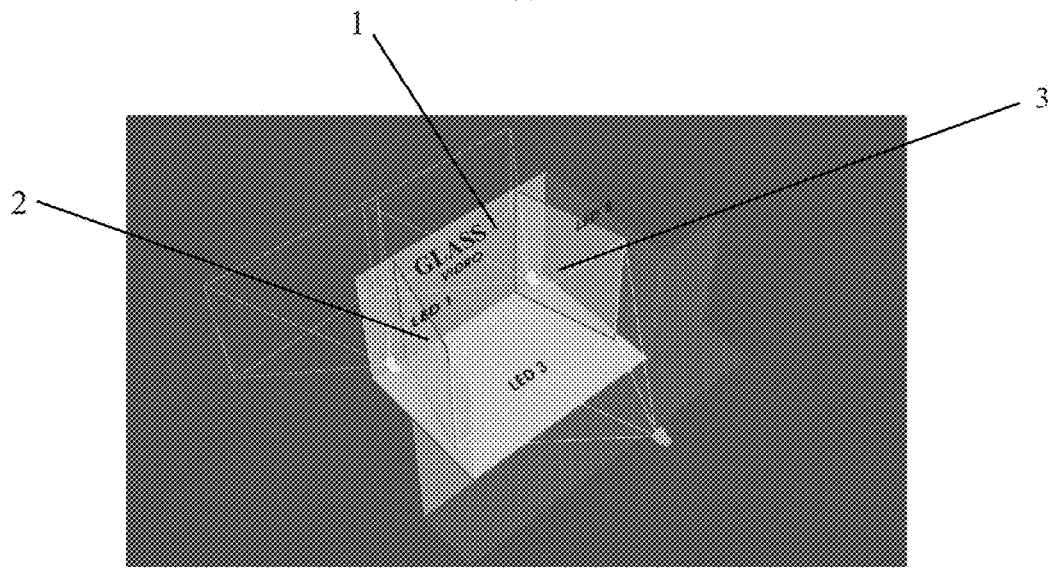
FIG. 3 shows a top view of the studio and the configuration of the panels and scenographic elements.
Figure 4:
FIG. 4 shows infographics and an animated virtual character inserted into the video by graphics servers.
Figure 5:
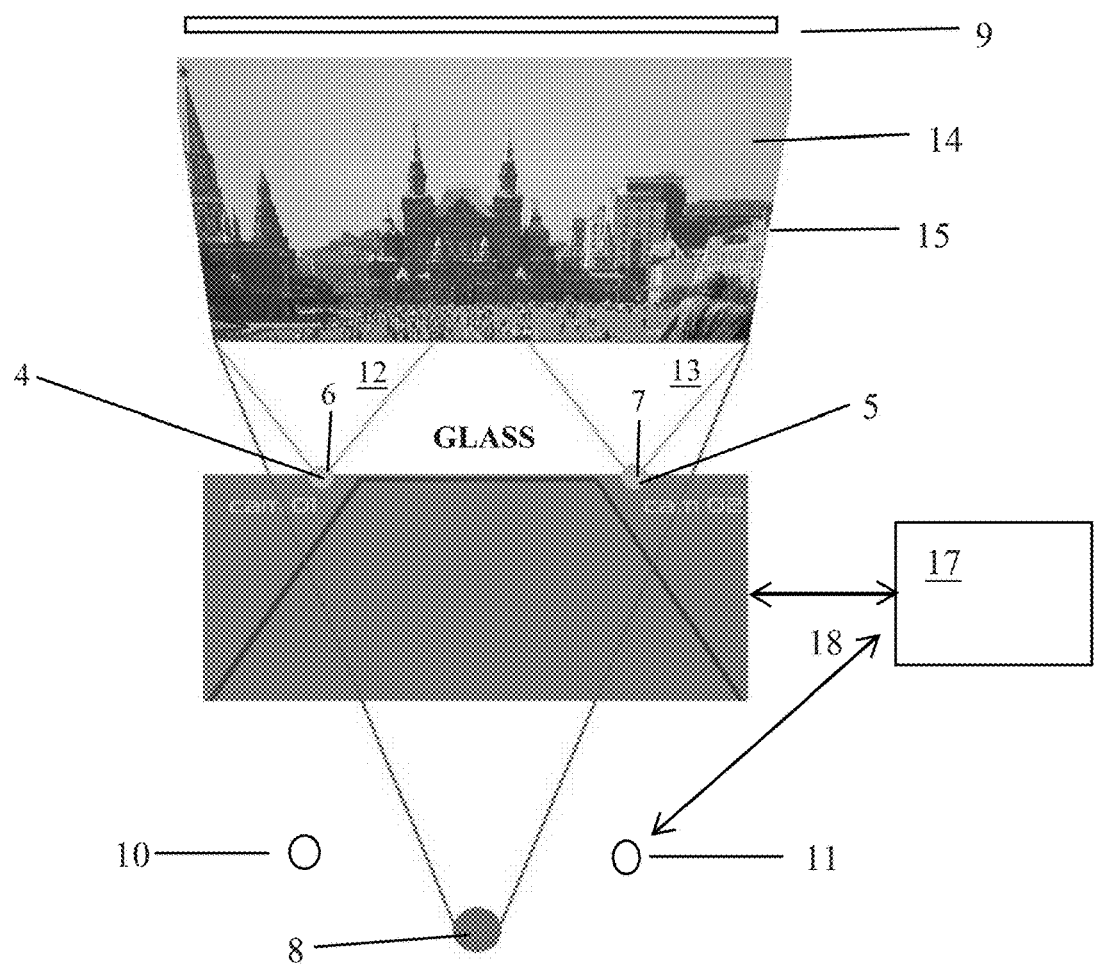
FIG. 5 shows the physical layout of the studio, with the anchor points of the panels.
Figure 6:
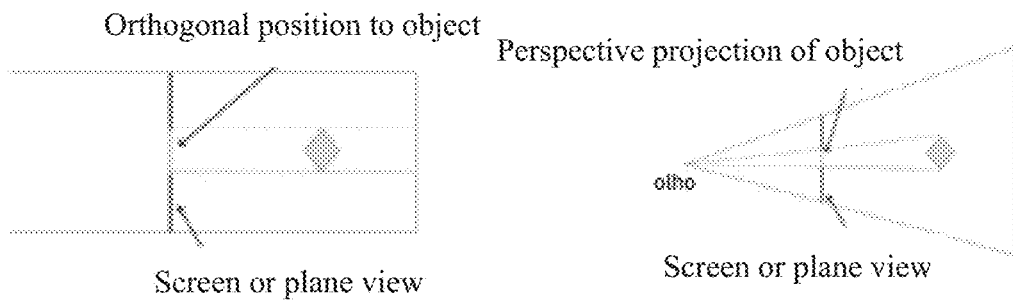
FIG. 6 shows a configuration of the asymmetric frustrum projection technique.
Figure 7:
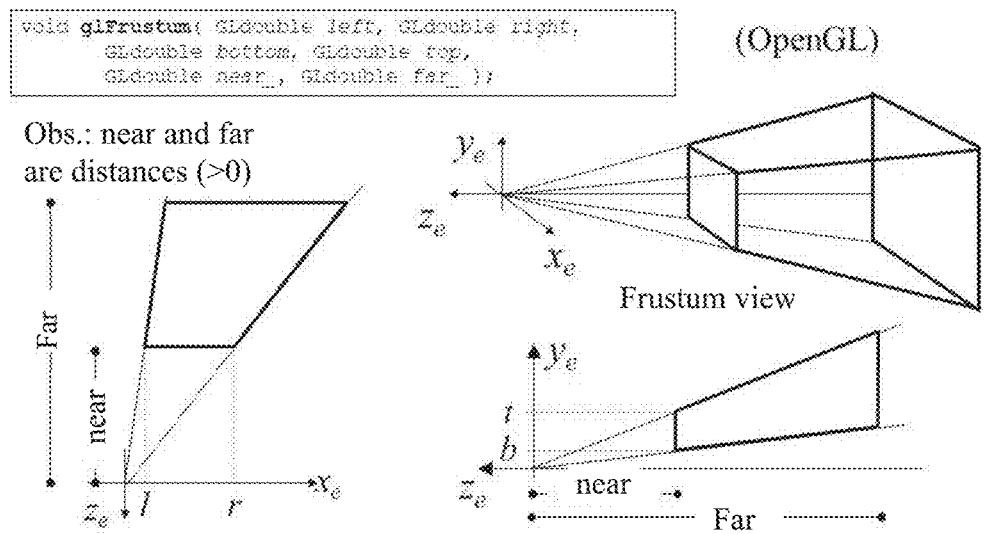
FIG. 7 shows the asymmetric frustrum distortions.

The present invention solves the aforementioned problems of studio size and camera movement by offering a more complete and robust approach, delivering a final image where the viewer is unable to perceive what is real or virtual and executing everything in real time, that is, permissible in live programs.

In this way, the solution presented expands the perception of space in the studio through the concept of scene extension, making use of LED screens, a glass background overlooking a real environment, cameras with movement tracking sensors and software responsible for controlling the images displayed on the screens.

LED Screens

LED screens are arranged laterally, perpendicular to the floor and rotated in relation to the background window, forming an angle of 120 degrees. This angle may vary, however it must be greater than 90 degrees.

LED technology was chosen due to its high resolution compared to other existing technologies. This resolution is greater not only in the number of pixels but also in the intensity of the colors. There is additional importance in the intensity of colors due to the incidence of this lighting on the real environment. This effect will contribute to the presenter's perception of insertion in the virtual environment.

Glass Background

The background is important to reinforce the effect of inserting the studio into a real environment.

Next to the glass back (1) and hidden behind the LED side panels (2, 3) are two static cameras (4, 5) that capture complementary images to those viewed through the glass back. These complementary images are sent to servers that distort them according to the studio camera's perspective and forward them for display on the side panels. When viewed through the studio camera, the images on the panels extend the view offered by the glass background. However, if viewed from any point of view other than the camera, they appear distorted and out of context.

Cameras with Motion Sensors

Two cameras with motion sensors (10, 11) are positioned inside the studio. They have the characteristics of not only tracking movements, but also promoting changes in the lens (zoom and focus, for example). This data is captured and sent to the graphics server that interprets it and, thus, deforms the images captured by the static cameras next to the glass background to be displayed on the screens according to the perspective of the cameras positioned inside the studio.

Sensors and tracking systems are commonly known in the art.

Software is used to generate and provide graphics for projections on LED screens.

One embodiment of the invention allows the composition of an entirely virtual studio, consisting of LED panels on the walls, ceiling and floor.

The term "Virtual insertions" can be understood as all computer graphics inserted on top of the image, such as: scoreboards, cards, objects, characters and graphic elements in general.

The physical studio (16) is made up of an entire front wall made of glass, and the other walls are opaque, behaving transparently. The effect sought would be to recreate a 180-degree studio (Panoramic) and, to achieve this, the side walls should be made of glass, or invisible.

The physical studio can have any desired size, and the LED panels are then positioned on each side, rotated approximately 30 degrees, with the panel being the hypotenuse of the triangle formed between it, the glass and the wall, with said angle formed between the wall and the panel.

The inclination of the panels avoids aberrations in the image due to the angle at which the LEDs light emitted, when observed by the camera, otherwise they could suffer a total reflection effect internally and appear dark, in addition to creating a hidden area to position between the panel and wall a static camera with a wide-angle lens (6, 7) (170 degrees) glued to the glass to capture the exterior in process (called stitching).

The floor made of LED boards allows the graphics to be changed, to display images or complete the current floor itself.

Application of filters and films (9) is carried out to reach luminance levels on the glass compatible with the equalization of the images generated in the LED and the images received through the glass on the front wall.

Also as an integral part of the studio's internal assembly, a sensorized crane was used for camera tracking purposes.

A graphical computing system (17) is used and is installed on servers that are located in the central art and receives the camera and lens tracking data by a connection, such as ethernet.

The process for the final effect consists of the following steps:
  capture of images to complement the scenery through 1 or 2 or more cameras with wide-angle lens(es);
  the images from these cameras go through a process called stitching, which consists of creating a single image by superimposing the common areas (12, 13) between the 2 cameras, resulting in a filmed panoramic image (14);
  the panoramic image being sent to the computer graphics system (17), which projects it onto a virtual plane (15) that is moved away and scaled to overlap and artistically match the real image;
  camera and lens tracking sensors are added, so that, in real time, the cameras used for transmission have their intrinsic and extrinsic data, which is informed to the computer graphics system;
  for each transmission camera, a computer graphics system is required receiving all the information mentioned above;
  each computer graphics system calculates the projective distortion of the panoramic image, which is projected onto the LED panels, always illustrating the current camera's point of view. This way the image of the LEDs merges with the real image of the window;
  all video signals need to be adjusted by TV systems so that they have a calculated delay, so that the videos are displayed without delay and in the right order.

The computer graphics system is installed on servers located in the technical center and receives camera and lens tracking data (18) via a connection, such as ethernet.

The studio can be made up of two side LED panels, optionally an LED panel on the floor and a glass window at the back. The side panels are perpendicular to the floor and rotated in relation to the background window forming an angle of 120 degrees (for correct operation, the angle must be greater than 90 degrees).

Behind each side panel is one or more static cameras with one or more wide-angle lenses (6, 7) with a viewing angle approaching 180 degrees, pointing out of the studio through the glass window. The video captured by each of these cameras is fed into a processor and sent to the corresponding side panel. This processor, in addition to video from the rear camera on the side panel, also receives position and lens data from the studio's main camera (8).

In an alternative embodiment, only a static camera can be used to capture the external image.

In an alternative embodiment, the still camera may have one or more wide-angle lenses.

frustrum projection technique, available and implemented in all software and programming frameworks for real-time computer graphics already known in the art.

The distortion from frustrum to asymmetric is also implemented by commercially available software, represented by the function described below.

Once the system receives camera position data in relation to the studio, that is, geolocating the camera in the studio, a virtual camera is created with the same characteristics and changes in lens, camera and position occurring in real time, this data is duplicated and simultaneously feed two virtual systems. The first system processes everything related to distortions for the LED screens. The second system applies augmented reality elements.

The LED panel has a processing time to display the images, therefore, once system 2, responsible for virtual insertions, needs to be delayed so that system 1 projects the image complementary to the glass onto the LED, before System 2 Captures the studio image to make the virtual insertions. The delay, known as "delay", is variable, being in the range of 3 frames in the worst case.

To enable the calculation of projective distortion and other resources, the servers in the technical center, where the systems are installed, are fed with tracking data from the camera and lens, for example via ethernet or any other compatible means, and with video, such as via video cables. The system is divided into modules: the projective distortion of the panoramic image is calculated by part of the system, which is commercially available software; and the 3D elements inserted in the studio are generated by systems that will not be described here.

The perception of a virtual window is due to the fact that there is always temporal coherence between the real image seen through the glass and the studio complemented by LED panels. The effect as described generates a perception of a real scenario, much larger than the physical space available with fluid graphic interventions.

From the foregoing, it will be seen that numerous modifications and variations can be made without departing from the true spirit and scope of the new concepts of the present invention. It should be understood that no limitations with respect to the specific embodiments illustrated are intended or should be inferred. The description is intended to cover all said modifications that fall within the scope of the invention.

The invention claimed is:
1. An image acquisition and projection system for a studio, comprising:
  a glass background window, Light Emitting Diode (LED) side panels disposed laterally with respect to the glass background window, perpendicular to the floor and rotated relative to the glass background window and forming an angle of greater than 90 degrees, the glass background window with a view to a real environment;
  cameras with motion tracking sensors positioned inside the studio and configured to capture images from within the studio;

static cameras that are behind each LED side panel with one or more wide angle lenses with a view angle of 180 degrees, pointing outside the studio through the glass background window and configured to acquire complementary images to those viewed through the glass background window; and a computer system configured to generate and provide graphics from the complementary images and from tracking data from the motion tracking sensors for projections on the LED side panels.

2. The image acquisition and projection system of claim 1, comprising side-walls, wherein the LED side panels are rotated 30 degrees with respect to the side-walls.

3. The image acquisition and projection system of claim 1, wherein the computer system is configured to receive the complementary images from the static cameras and distort the complementary images according to a perspective of one of the cameras with motion tracking sensors and forward distorted complementary images for display on the LED side panels.

4. The image acquisition and projection system of claim 1, wherein the static cameras are configured to capture images that complement the internal scene.

5. The image acquisition and projection system of claim 1, wherein the complementary images of the static cameras comprise common overlapping zones suitable for image stitching to create a single image.

6. The image acquisition and projection system of claim 1, wherein the static cameras are configured to create a panoramic image obtained by image stitching that is sent to the computer system that scales and projects the panoramic image onto a virtual plane to overlap and merge with the image viewed through the glass background window.

7. The image acquisition and projection system of claim 1, wherein the cameras with motion tracking sensors are capable of tracking movements and promoting changes in the lens according to the movement and capturing the tracking data, wherein the computer system is configured to receive and interpret the tracking data.

8. The image acquisition and projection system of claim 1, wherein the computer system is configured to receive the tracking data from the cameras with motion tracking sensors through a data connection.

9. The image acquisition and projection system of claim 1, wherein the motion tracking sensors cameras further comprise camera and lens tracking sensors.

10. An image acquisition and projection system according to claim 3, wherein each computer system calculates the projected distortion of the panoramic image obtained by stitching.

11. The image acquisition and projection system according to claim 1, wherein videos displayed without delay and in the correct order are adjusted by TV systems having a calculated delay.

12. A studio including the image acquisition and projection system according to claim 1, wherein the glass background window comprises filters and films to balance the light intensity of the view to the real environment transmitted through the glass background window and the projections on the LED side panels.

13. A method of image acquisition, projection and insertion method using the system as defined in claim 1, comprising the steps of:

capturing the complementary images to those viewed through the glass background window by the static cameras and creating a panoramic image by image stitching;

sending the panoramic image obtained by image stitching to the computer system and scaling and projecting the panoramic image onto a virtual plane to overlap and merge with the image viewed through the glass background window;

using the cameras with motion tracking sensors for real-time transmission having intrinsic and extrinsic data input to the computer system;

calculating the projected distortion of the panoramic image by the computer system;

setting video signals by TV systems, which calculate a delay; and display of the video signals without delay calculated at previous step and in the correct order.

* * * * *